United States Patent [19]

Kuriyama et al.

[11] Patent Number: 4,981,937
[45] Date of Patent: Jan. 1, 1991

[54] TELECHELIC VINYL POLYMER HAVING ALKOXYSILYL GROUP

[75] Inventors: Akira Kuriyama, Osaka; Toshio Kadowaki, Amagasaki; Mikiko Yamaguchi, Kyoto, all of Japan

[73] Assignee: Sunstar Giken Kabushiki Kaisha, Osaka, Japan

[21] Appl. No.: 327,396

[22] Filed: Mar. 22, 1989

Related U.S. Application Data

[63] Continuation of Ser. No. 86,241, Aug. 17, 1987, abandoned, which is a continuation of Ser. No. 902,657, Sep. 2, 1986, abandoned.

[30] Foreign Application Priority Data

Sep. 24, 1985 [JP] Japan .............................. 60-211667
May 29, 1986 [JP] Japan .............................. 61-125014

[51] Int. Cl.$^5$ .................................................. C08F 20/12
[52] U.S. Cl. ................................. 526/328; 526/250; 526/255; 526/279; 526/329; 526/343; 526/344; 556/427
[58] Field of Search .................. 526/250, 328, 329.17; 556/427

[56] References Cited

U.S. PATENT DOCUMENTS 3,655,633  4/1972  Saam .................................. 526/194
4,543,403  9/1985  Isayama .............................. 526/263

FOREIGN PATENT DOCUMENTS 2105981  4/1972  France .

OTHER PUBLICATIONS

Makromol. Chem., Rapid Commun., 3, 127-132 (1982).
"Kobunshi" (High Polymers, Japan), 30 (5), 298 (1981) with partial English translation.
Journal of the Adhesion Society of Japan, 19 (6), 252 (1983) with partial English translation.
J. Am. Chem. Soc., 105, 5706 (1983).

*Primary Examiner*—Christopher Henderson
*Attorney, Agent, or Firm*—Wegner, Cantor, Mueller & Player

[57] ABSTRACT

A vinyl polymer having alkoxysilyl groups at both terminals of the formula:

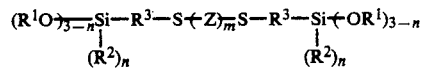

wherein $R^1$ and $R^2$ are the same or different and are each an alkyl having 1 to 4 carbon atoms, $R^3$ is an alkylene having 1 to 4 carbon atoms, n is an integer of 0 to 2, Z is at least one group of the formulae:

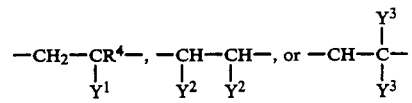

(wherein $R^4$ is hydrogen or methyl, $Y^1$ is an ester residue having 2 to 11 carbon atoms, phenyl or a halogen, $Y^2$ is an ester residue having 2 to 6 carbon atoms or a halogen, and $Y^3$ is fluorine or chlorine atom), m is 10 to 10,000, which has excellent physical strength and is useful as an ingredient for paints, adhesives, sealing agents, and tacking agents, and an intermediate therefor, and a process for the production thereof.

2 Claims, No Drawings

TELECHELIC VINYL POLYMER HAVING ALKOXYSILYL GROUP

This application is a continuation of U.S. application Ser. No. 086,241, filed Aug. 17, 1987, (now abandoned), which is a continuation of U.S. application Ser. No. 902,657, filed Sept. 2, 1986 (now abandoned).

This invention relates to novel telechelic vinyl polymers having alkoxysilyl group, intermediates, and a process for the production thereof. More particularly, it relates to telechelic vinyl polymers having alkoxysilyl groups at both terminals of the formula:

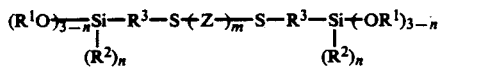

wherein $R^1$ and $R^2$ are the same or different and are each an alkyl having 1 to 4 carbon atoms, $R^3$ is an alkylene having 1 to 4 carbon atoms, n is an integer of 0 to 2, Z is at least one group of the formulae:

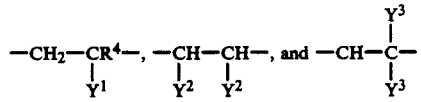

(wherein $R^4$ is hydrogen or methyl, $Y^1$ is an ester group having 2 to 18 carbon atoms, phenyl or a halogen, $Y^2$ is an ester group having 2 to 6 carbon atoms or a halogen, and $Y^3$ is fluorine or chlorine atom), m is 10 to 10,000, which are a crosslinkable resin having excellent physical strength and are useful as an ingredient for paints, adhesives, sealing agents, tacking agents, and the like, intermediates for producting the vinyl polymers, and a process for the production of the vinyl polymers.

TECHNICAL BACKGROUND AND PRIOR ART

It is well known that silicon resins have excellent weatherability, heat resistance and chemical resistance and are useful as an ingredient for paints, adhesives, sealing agents, tacking agents, and the like, but these resins are not necessarily widely used because of their high cost. It has been tried to introduce a reactive silyl group into various non-expensive resins in order to use these resins as a replacement of the expensive silyl resins. Among these replacements, a practically used product is a polypropylene glycol (PPG) having alkoxysilyl groups at both terminals [cf. "Kobunshi" (High Polymers, Japan), 30 (5), 298 (1981), and Journal of the Adhesion Society of Japan, 19 (6), 252 (1983))], but this product is inferior in weatherability and heat resistance because its main chain is composed of PPG.

It has also been known that acrylic resins have excellent weatherability and heat resistance, and the resins are widely used for the production of paints and molded products. In order to give various functions to the acrylic resins, it has recently been tried to introduce various functional groups into the resins. For instance, an acrylic monomer is copolymerized with other monomer having a functional group by a radical polymerization, by which a functional group is introduced into the side chain of the polymer. It is also known to introduce a functional group at the polymer terminal by using a chain transfer agent or initiator which have a functional group. By these known methods, however, it is difficult to prepare a telechelic vinyl polymer having reactive silyl groups at both terminals thereof.

It is also reported that introduction of a silyl group at the terminal of a polymethacrylic ester has been accomplished by an ion polymerization (cf. J. Am. Chem. Soc., 105, 5706 (1983)]. However, according to this method, a complicated initiator is to be used, and only methyl methacrylate can be used as the monomer, and further, it is difficult to control the reaction conditions. Thus, this method is not suitable from the practical viewpoint.

SUMMARY OF THE INVENTION

The present inventors have intensively studied as to improved method for introducing a reactive silyl group into both terminals of an acrylic resin having excellent weatherability and heat resistance, and have found that the desired polymer, i.e. telechelic vinyl polymer having alkoxysilyl groups at both terminals, can be produced by subjecting a disulfide compound having an alkoxysilyl group and a vinyl monomer including an acrylic monomer to a photopolymerization reaction.

An object of this invention is to provide novel telechelic vinyl polymer having alkoxysilyl groups at both terminals thereof. Another object of the invention is to provide a process for the production of the vinyl polymer. A further object of the invention is to provide novel intermediate suitable for the production of the telechelic vinyl polymer. These and other objects and advantages of the invention will be apparent to persons skilled in the art from the following description.

DETAILED DESCRIPTION OF THE INVENTION

The telechelic vinyl polymers having alkoxysilyl groups at both terminals of this invention have the formula (I) as mentioned hereinbefore.

The substituents in the formula (I) means specifically the following groups.

The alkyl group for $R^1$ and $R_2$ denotes an alkyl having 1 to 4 carbon atoms, such as methyl, ethyl, n-propyl and n-butyl, the alkylene group for $R^3$ denotes an alkylene having 1 to 4 carbon atoms, such as methylene, 1,2-ethylene, 1,3-propylene, and 1,4-butylene. The ester group for $Y^1$ denotes alkoxycarbonyl having 2 to 18 carbon atoms (i.e. —COOR' wherein R' is an alkyl having 1 to 17 carbon atoms, and aralkyl having 7 to 8 carbon atoms, or a cycloalkyl having 6 to 8 carbon atoms). such as methoxycarbonyl, ethoxycarbonyl, propoxycarbonyl, butoxycarbonyl, pentyloxycarbonyl, 2-ethylhexyloxycarbonyl, lauroyl, stearoyl, benzyloxycarbonyl, cyclohexyloxycarbonyl, etc. The ester group for $Y^2$ denotes an alkoxycarbonyl having 2 to 6 carbon atoms (i.e. —COOR" wherein R" is an alkyl having 1 to 5 carbon atoms) such as methoxycarbonyl, ethoxycarbonyl, propoxycarbonyl, butoxycarbonyl, and the like. The halogen for $Y^1$ and $Y^2$ includes chlorine and fluorine.

The vinyl polymers (I) can be prepared by reacting at least one disulfide compound of the formula:

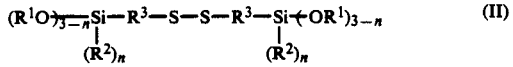

wherein $R^1$, $R^2$, $R^3$ and n are as defined above, with at least one vinyl monomer of the formula:

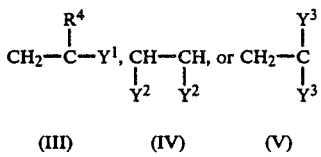

(III) (IV) (V)

wherein $R^4$, $Y^1$, $Y^2$, $Y^3$, and m are as defined above by a photopolymerization reaction.

The disulfide compounds (II) include specifically the following compounds:
bis(trimethoxy-(or triethoxy-)silylmethyl)disulfide,
bis(trimethoxy-(or triethoxy-)silylethyl)disulfide,
bis(trimethoxy-(or triethoxy-)silylpropyl)disulfide,
bis(trimethoxy-(or triethoxy-)silylbutyl)disulfide,
bis(methyl-dimethoxy-(or diethoxy-)silylmethyl)disulfide,
bis(methyl-dimethoxy-(or diethoxy-)silylethyl)disulfide,
bis(methyl-dimethoxy-(or diethoxy-)silylpropyl)disulfide,
bis(methyl-dimethoxy-(or diethoxy-)silylbutyl)disulfide,
bis(ethyl-dimethoxy-(or diethoxy-)silylmethyl)disulfide,
bis(ethyl-dimethoxy-(or diethoxy-)silylethyl)disulfide,
bis(ethyl-dimethoxy-(or diethoxy-)silylpropyl)disulfide,
bis(ethyl-dimethoxy-(or diethoxy-)silylbutyl)disulfide,
bis(propyl-dimethoxy-(or diethoxy-)silylmethyl)disulfide,
bis(propyl-dimethoxy-(or diethoxy-)silylethyl)disulfide,
bis(propyl-dimethoxy-(or diethoxy-)silylpropyl)disulfide,
bis(propyl-dimethoxy-(or diethoxy-)silylbutyl)disulfide,
bis(dimethyl-methoxy-(or ethoxy-)silylmethyl)disulfide,
bis(dimethyl-methoxy-(or ethoxy-)silylethyl)disulfide,
bis(dimethyl-methoxy-(or ethoxy-)silylpropyl)disulfide,
bis(dimethyl-methoxy-(or ethoxy-)silylbutyl)disulfide,
bis(diethyl-methoxy-(or ethoxy-)silylmethyl)disulfide,
bis(diethyl-methoxy-(or ethoxy-)silylethyl)disulfide,
bis(diethyl-methoxy-(or ethoxy-)silylpropyl)disulfide,
bis(diethyl-methoxy-(or ethoxy-)silylbutyl)disulfide,
bis(dipropyl methoxy-(or ethoxy-)silylmethyl)disulfide,
bis(dipropyl-methoxy-(or ethoxy-)silylethyl)disulfide,
bis(dipropyl methoxy-(or ethoxy-)silylpropyl)disulfide, and
bis(dipropyl-methoxy-(or ethoxy-)silylbutyl)disulfide.

The vinyl monomers to be reacted with the bisulfide compounds include, for example, acrylic acid esters, such as ethyl acrylate, butyl acrylate, 2-ethylhexyl acrylate, propyl acrylate, pentyl acrylate, stearyl acrylate, etc. methacrylic acid esters such as methyl methacrylate, ethyl methacrylate, butyl methacrylate, 2-ethylhexyl methacrylate, lauryl methacrylate, benzyl methacrylate, cyclohexyl methacrylate, etc.; styrene or its derivatives, such as α-methylstyrene, etc. fumaric acid esters, such as diethyl fumarate, dibutyl fumarate, dipropyl fumarate, etc.: vinyl halides, such as vinyl chloride, vinylidene chloride, vinyl 1,2-difluoride, vinylidene fluoride, vinyl fluoride, etc. These vinyl monomers may be used alone or in combination of two or more thereof.

In the above reaction, the disulfide compound is used in an amount of 0.05 to 50 parts by weight per 100 parts by weight of the vinyl monomer, and they are reacted in an appropriate organic solvent (e.g. toluene, xylene, hexane, ethyl acetate, dioctyl phthalate, etc.) or without solvent by a photopolymerization reaction in a usual manner, for instance, by irradiation of light at room temperature or an elevated temperature (e.g. 5° to 60° C.) for 4 to 30 hours.

In order to enhance the strength of the resin product after cured, a part of the vinyl monomer (e.g. 0.1 to 10 parts by weight in 100 parts by weight) may optionally be replaced by a monomer having an alkoxysilyl group, by which the alkoxysilyl group is further introduced into the side chain of the polymer and thereby the cross-linking density after cured is increased and then the resin strength is more improved. Suitable examples of the monomer having an alkoxysilyl group are trimethoxysilylpropyl acrylate, trimethoxysilylpropyl methacrylate, methyl-dimethoxysilylpropyl acrylate, methyl-dimethoxysilylpropyl methacrylate, vinyl-triethoxysilane, vinyl-methyl-diethoxysilane, vinyl-dimethylethoxysilane, and the like.

When the polymerization system contains water even in a slight amount, a monomer having an acid group such as carboxyl, phosphate or sulfoxyl group can not be used, because the polymerization system is gelled during the polymerization reaction.

The mechanism of the photopolymerization reaction of this invention is schematically illustrated by the following reaction scheme (i) to (iv):

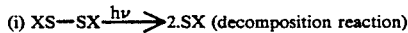

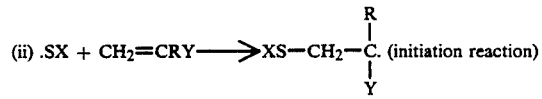

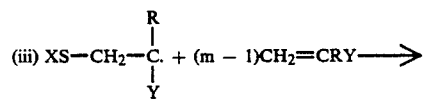

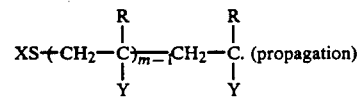

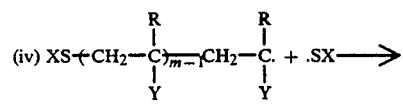

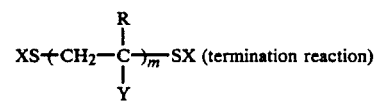

wherein X is an alkyl having an alkoxysilyl group, and $CH_2=CRY$ means a vinyl monomer as mentioned hereinbefore.

In the above reaction schemes, the disulfide compound (XS-SX) is easily decomposed by irradiation of UV light to produce a thiyl radical (.SX) (in the reaction scheme-i). A part of the produced radical is added to the vinyl monomer to produce an initiation radical (in the reaction scheme-ii). The initiation radical reacts subsequently with the vinyl monomer to produce a high molecular radical (in the reaction scheme-iii). This reaction proceeds in the same manner as in a usual radical reaction. The thus-produced high molecular radical reacts with the thiyl radical present in the reaction system, and then the reaction is terminated by a primary radical termination reaction to produce a polymer (or oligomer) having alkoxysilyl groups at both terminals thereof (in the reaction scheme-iv).

The reaction mechanism has already been reported by Dr. Ohtsu of Osaka City University [cf. Macromol. Chem., Rapid Commun., 3, 127 (1982)]. in which other telechelic polymer is prepared by using other disulfide compound.

The vinyl polymer of this invention as prepared above has alkoxysilyl groups at the terminals and is a crosslinkable resin having superior mechanical strength. When a vinyl monomer having a high glass transition temperature (Tg) is used in the above reaction, the product is suitable as an ingredient for paints and adhesives, and when a vinyl monomer having a low glass transition temperature is used, the product is suitable for sealing agents and tacking agents.

The disulfide compounds of the formula (II) can be prepared by an improved process of this invention, which comprises reacting a mercaptoalkylalkoxysilane of the formula:

(VI)

wherein $R^1$, $R^2$, $R^3$, and n are as defined above, with a sodium alcoholate of the formula:

$$R^1ONa \qquad (VII)$$

wherein $R^1$ is as defined above, and reacting the resultant with iodine.

Suitable examples of the starting mercaptoalkylalkoxysilane compound are γ-mercaptopropyltrimethoxysilane γ-mercaptopropyltriethoxysilane, γ-mercaptopropylmethyldimethoxysilane, mercaptomothyltrimethoxysilane, mercaptomethyl-methyldimethoxysilane, β-mercaptoethyltrimethoxysilane, β-mercaptoethylmethyldimethoxysilane, and the like.

Suitable examples of the alcoholate ((VII) are sodium methylate, sodium ethylate, sodium propylate, sodium butylate, and the like.

The above reaction can be done in the following manner.

The silane compound (VI) is reacted with an equimolar amount of the alcoholate (VII) in a solvent, preferably the same alcohol as used for the alcoholate (VII), and thereto an equimolar amount of iodine is added in portions to the reaction mixture, and the mixture is reacted at room temperature for 3 to 5 hours. The reaction mixture is distilled under reduced pressure to remove the solvent, whereby white sodium iodide is precipitated. After completion of the removal of solvent (alcohol), sodium iodide is filtered off to give the desired disulfide (II) in high yield and high purity. The above reaction can proceed under atmospheric pressure without heating.

The reaction may be illustrated by the following reaction schemes:

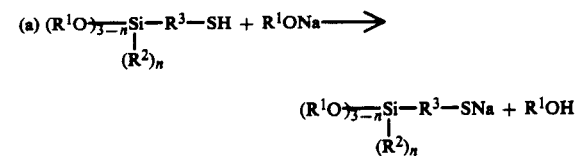

-continued

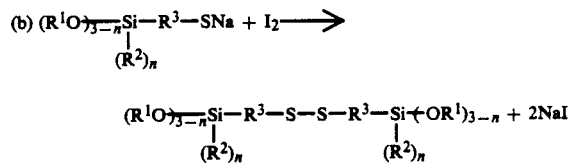

wherein $R^1$, $R^2$, $R^3$ and n are as defined hereinbefore.

The disulfide compounds (II) thus prepared are useful as the starting material for the production of the telechelic vinyl polymer and further are also useful as an improver of rubbers, as a primer and also as a modifier of various polymers.

This invention is illustrated by the following Examples but should not be construed to be limited thereto.

In Examples, the purity of disulfide compounds is determined in the following manner:

A disulfide is distilled in vacuum and subjected to purification with column to obtain the disulfide having 100% purity. As to the standard purified disulfide thus obtained, UV spectrum is measured, and the wavelength of the maximum absorption (λmax) and the molecular extinction coefficient (ε) are calculated. Based upon the data of the standard purified product, the purity of the disulfide compounds is calculated by the following equation:

$$C \text{ (mole \%)} = \frac{A \times \lambda max}{a \times \epsilon} \times 100$$

wherein C is purity of the test sample (mole %), A is absorbance of the standard product, and a is a concentration of the sample (g/liter).

EXAMPLE 1

Preparation of bis[γ-(trimethoxysilyl)propyl]disulfide

A 28% solution of sodium methylate in methanol (97.6 g. 0.51 mole) is diluted with methanol (100 ml), and thereto is added γ-mercaptopropyltrimethoxysilane (100 g, 0.51 mole). The temperature of the mixture raises in a certain degree owing to the mixing heat but return to room temperature after about 30 minutes. To the mixture is added in portions iodine (64.6 g. 0.51 mole) with stirring. In view of exothermic reaction, the reaction vessel is cooled with ice water. After completion of the addition of iodine, the brown mixture is allowed to stand at room temperature for 3 hours to give a clean liquid having pale yellow color. The reaction mixture is moved to a flask, and the methanol solvent is distilled off under reduced pressure with a rotary evaporator. The residue containing white crystals and pale yellow liquid is filtered to separate the oily liquid (86.4 g). This liquid is subjected to analyses of IR, H-NMR and UV spectra, and thereby, it is confirmed that the liquid product is bis[γ-(trimethoxysilyl)propyl]disulfide of the formula:

$$(CH_3O)_3Si-(CH_2)_3S-S-(CH_2)_3Si-(OCH_3)_3$$

which nas a purity of 92% or more (yield: 79.9%).

EXAMPLE 2

Preparation of bis[γ-(methyl-dimethoxysilyl)propyl]disulfide

Sodium methylate (90 g. 1.7 mole) is dissolved in methanol (about 200 g), and to the mixture are added γ-mercaptopropyl-methyldimethoxysilane (300 g, 1.7 mole) and further iodine (211.5 g, 1.7 mole) in the same manner as in Example 1. After distilling off methanol, the residue is filtered to give pale yellow liquid (256 g). According to analysis thereof by IR, H-NMR and UV spectra, this product is identified as bis[γ-(methyl-dimethoxysilyl]propyl]disulfide of the formula:

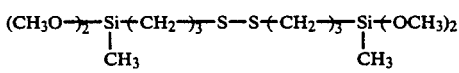

which has a purity of 94% (yield: 80.7%).

REFERENCE EXAMPLE 1

A four necked falsk provided with a stirrer, a condenser, a thermometer, a funnel and a gas-introducing tube is charged with benzene (300 ml) and γ-mercaptopropyltrimethoxysilane (100 g, 0.51 mole). While keeping with stirring the mixture at a liquid temperature of 5°–12° C. on an ice water bath, a solution of sulfuryl chloride (34.4 g, 0.255 mole) in benzene (100 ml) is added dropwise to the mixture with introducing $N_2$ gas. After completion of the addition, the mixture is stirred at room temperature for 6 hours. To the mixture is added triethylamine (about 50 ml) under cooling, and the resulting precipitates are filtered off. The filtrate is distilled under reduced pressure to remove the solvent to give a yellowish brown, viscous liquid. It is confirmed by the IR spectrum analysis that this product is bound with a large amount of polyorganosiloxane. The product is subjected to fractional distillation in vacuum to give bis[γ-(trimethoxysilyl]propyl]disulfide 15.4 g. yield: 15.5%) in a fraction of a boiling point of 174°–182° C. (1.5 mmHg).

Separately, the above reaction product is purified by silica gel column chromatography to give bis[γ-(trimethoxysilyl)methoxysilyl)propyl]disulfide (yield: 42%).

EXAMPLE 3

A four necked flask provided with a mechanical stirrer, a condenser, a nitrogen gas introducing tube and a thermometer is charged with butyl acrylate (223 g) and bis(methyl-dimethoxysilylpropyl)disulfide (6 g). The mixture is polymerized under nitrogen gas stream while irradiating UV light with SHL 100 UV lamp (manufactured by Toshiba Corporation) which is set at a distance of about 3 cm from bottom of the flask. The temperature of the mixture is kept at 15° to 20° C. by cooling the flask. With proceeding the polymerization reaction, the reaction mixture shows increased viscosity, and after about 15 hours, there is obtained a viscous liquid of a polymer. The product is taken out and dried at 110° C. under reduced pressure for 4 hours. The degree of polymerization is 77.2%, which is calculated based on the change of weight.

Subsequently, the reaction mixture is subjected to drying in vacuum to remove the remaining monomer. To the polymer thus obtained (100 parts by weight) is added n-butyl tin oxide (0.6 part by weight), and the mixture is poured into a mold (depth 3 mm) on a polyethylene plate and then allowed to stand under conditions of 20° C. and 65% RH (relative humidity) for 7 days to give a translucent sheet-like cured product.

As to the product, there were measured various properties in accordance with the method as defined in JIS K-6301 (pulling rate: 300 mm/min) with 3# dumbbell specimen (JIS K 6301) and a strograph (manufactured by Toyo Seiki K.K.). As a result, it showed an elongation of 800–850%, and a strength at break of 8.5–9.3 kg/cm². When a dynamic viscoelasticity of the cured product was measured (at a temperature range of −100° C. to 150° C.), and as a result, it was confirmed that the product is a crosslinked polymer, which is one of the factors for proving that the product is telechelic.

EXAMPLE 4

A hard glass-made sealing tube is charged with butyl acrylate (64 g) and bis(trimethoxysilylpropyl)disulfide (2.1 g) and purged with nitrogen gas and then sealed. The tube is irradiated with UV light with a lamp at a distance of about 3 cm as used in Example 3 in a water bath at 15–20° C., by which the mixture is photopolymerized. After 16 hours, the resulting liquid polymer is taken out and dried at 110° C. for 4 hours, and based on the decrease of the weight. the degree of polymerization is measured. As a result, the degree of polymerization is 94.3%.

By using this polymer, there was prepared a cured sheet having rubber-like elasticity in the same manner as described in Example 3. The rubber properties of the cured sheet were measured in the same manner as in Example 3. As a result, it showed an elongation of 400–500% and a strength at break of 10.1–12.3 kg/cm².

EXAMPLE 5

By using methyl methacrylate (50 g), butyl acrylate (100 g), methyl-dimethoxysilylpropyl methacrylate (1 g), bis(methyl-dimethoxysilylpropyl)disulfide (3.5 g) and toluene (50 g), the photopolymerization reaction is carried out in the same manner as in Example 3 to give a clean viscous polymer liquid. Based on the weight change, the polymerization yield is measured. As a result, the yield is 85% (calculated as assumed that toluene is completely evaporated).

To the polymer liquid (100 parts by weight) is added n-butyl tin oxide (0.6 part by weight), and the mixture is coated in a thickness of about 0.1 mm on a polyethylene plate and then cured by allowing to stand in a room of 20° C. and 65% RH, by which a clean film is prepared.

As to this film, there were measured physical properties in accordance with the method as defined in JIS K-6301 (pulling rate: 300 mm/min) with 3# dumbbell specimen (JIS K-6301) and a strograph (manufactured by Toyo Seiki K.K.). As a result, it showed an elongation of 300%. and a strength at break of 30–50 kg/cm².

EXAMPLES 6 to 8

In the same manner as described in Example 5 except that the monomers and disulfides as shown in Table 1 are used, a polymer liquid is prepared by the photopolymerization. The polymerization yield is measured likewise. Besides, a film was prepared and the dumbbell sheet properties (elongation, strength at break) thereof were measured likewise. The results are shown in Table 1.

TABLE 1

|  | Ex. 6 | Ex. 7 | Ex. 8 |
|---|---|---|---|
| Monomers (g): | | | |
| MMA | 10 | — | — |
| 2-EHA | — | 260 | — |
| BA | — | — | 100 |
| St | — | — | 50 |
| KBM-502 | — | 1.0 | 1.0 |
| Disulfide (g): | | | |
| DMDS | 0.3 | 5.0 | 3.4 |
| Polymerization yield (%) | 41.7 | >95 | 78.3 |
| Elongation (%) | — | 200 | 200–300 |
| Strength at break (kg/cm$^2$) | — | 3.6–7.4 | 40–50 |

[Notes]:
The abbreviated ingredients and tradename means as follows:
MMA: Methyl methacrylate
2-EFA: 2-Ethylhexyl acrylate
BA: Butyl acrylate
St: Styrene
KBM-502 ®: γ-methacryloxysilyl-propylmethyl-dimethoxysilane
DMDS: Bis(methyl-dimethoxysilylpropyl)disulfide

What is claimed is:

1. A vinyl polymer produced by the process comprising photopolymerizing a vinyl monomer of the formula:

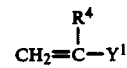

wherein R$^4$ is hydrogen or methyl, and Y$^1$ is a group of the formula: —COOR' wherein R' is an alkyl having 1 to 17 carbon atoms or phenyl, in the presence of a disulfide compound of the formula:

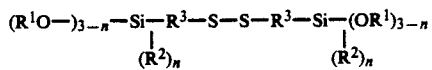

wherein R$^1$ and R$^2$ are independently an alkyl having 1 to 4 carbon atoms, R$^3$ is an alkylene having 1 to 4 carbon atoms, and n is an integer of 0 to 2.

2. The vinyl polymer according to claim 1, wherein the vinyl monomer is butyl arcylate and the disulfide compound is a member selected from the group consisting of bis[γ-(trimethoxylsilyl)propyl]disulfide and bis[γ-(methyldimethoxysilyl)propyl]disulfide.

* * * * *